(12) United States Patent
Kuntz

(10) Patent No.: US 12,209,708 B2
(45) Date of Patent: Jan. 28, 2025

(54) PRESSURE STORAGE DEVICE FOR STORING A MEDIUM, AND METHOD FOR OPERATING A PRESSURE STORAGE DEVICE

(71) Applicant: Robert Bosch GmbH, Stuttgart (DE)

(72) Inventor: Matthias Kuntz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/252,334

(22) PCT Filed: Aug. 18, 2021

(86) PCT No.: PCT/EP2021/072894
§ 371 (c)(1),
(2) Date: May 9, 2023

(87) PCT Pub. No.: WO2022/100902
PCT Pub. Date: May 19, 2022

(65) Prior Publication Data
US 2024/0011603 A1    Jan. 11, 2024

(30) Foreign Application Priority Data
Nov. 13, 2020   (DE) ..................... 10 2020 212 078.1

(51) Int. Cl.
*F17C 5/00*    (2006.01)
(52) U.S. Cl.
CPC ...... *F17C 5/007* (2013.01); *F17C 2205/0326* (2013.01); *F17C 2221/012* (2013.01); *F17C 2223/0123* (2013.01); *F17C 2250/043* (2013.01)
(58) Field of Classification Search
CPC ............. F17C 5/007; F17C 2205/0326; F17C 2201/012; F17C 2223/0123; F17C 2250/043
See application file for complete search history.

(56) References Cited

U.S. PATENT DOCUMENTS 10,461,345 B2   10/2019  Komiya
2004/0163731 A1*  8/2004  Eichelberger ............. F17C 1/00
                                                                141/284
(Continued)

FOREIGN PATENT DOCUMENTS

DE   102009049687 A1   4/2011
DE   112006003013 B4   7/2011
(Continued)

OTHER PUBLICATIONS

Translation of International Search Report for Application No. PCT/EP2021/072894 dated Dec. 7, 2021 (2 pages).

*Primary Examiner* — Jason K Niesz
(74) *Attorney, Agent, or Firm* — Michael Best & Friedrich LLP

(57) ABSTRACT

The present invention relates to a pressure storage device (10) for storing a medium (M) under pressure, comprising: at least a first pressure vessel (B1) having a first valve device (V1), and a second pressure vessel (B2) having a second valve device (V2); at least one feed line (Z) and/or one discharge line (A), which is connected to the first valve device (V1) and to the second valve device (V2); a control device (SE), which is connected to the first valve device (V1) and to the second valve device (V2) to open and/or close same and is configured to control filling and/or emptying of the first pressure vessel (B1) and of the second pressure vessel (B2) with and/or of the medium such that the pressure in the first pressure vessel (B1) and in the second pressure vessel (B2) is at or below a predefined pressure level.

10 Claims, 2 Drawing Sheets

(56) References Cited

U.S. PATENT DOCUMENTS

2007/0000561 A1    1/2007  Handa
2010/0025411 A1*   2/2010  Otsubo .................... F17C 1/14
                                                       220/581
2016/0116450 A1    4/2016  Saito

FOREIGN PATENT DOCUMENTS

DE    102018220655 A1   6/2020
WO      2020103993 A1   5/2020

\* cited by examiner

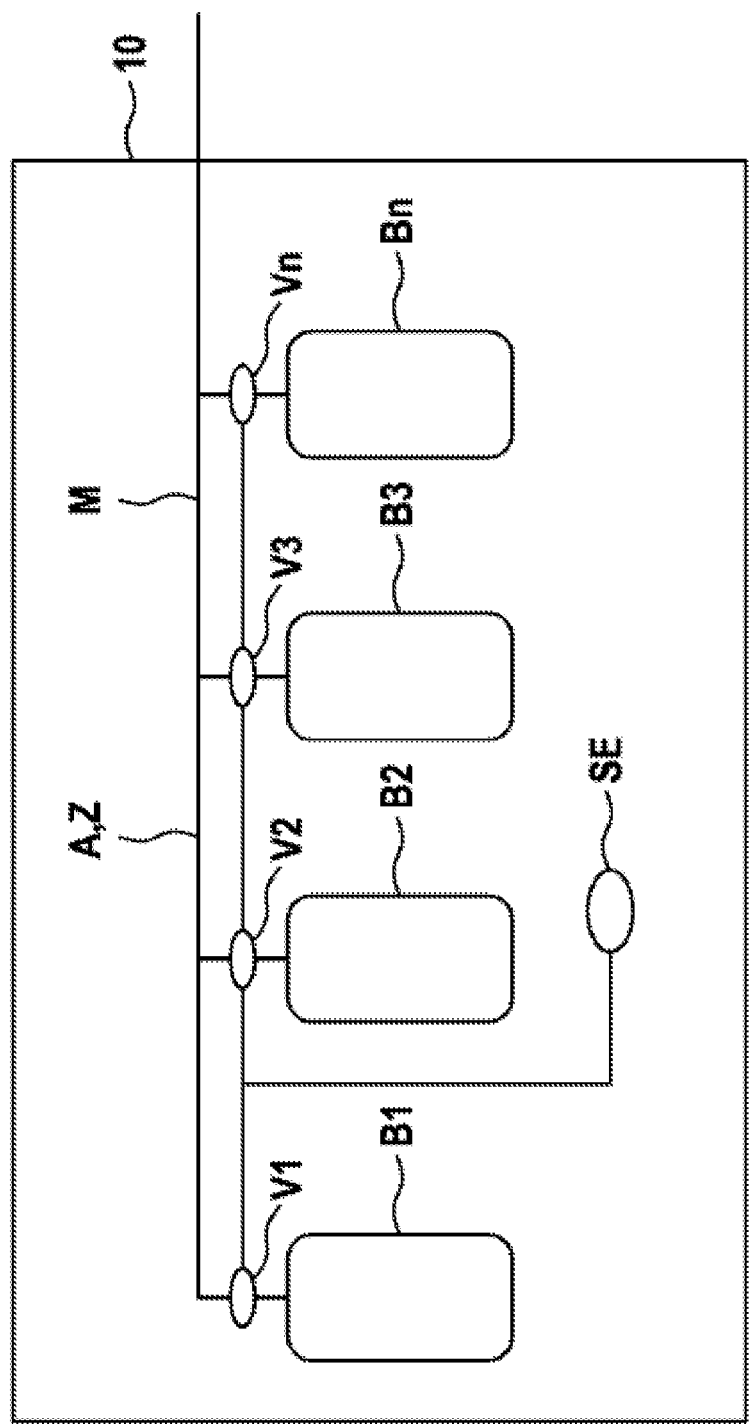

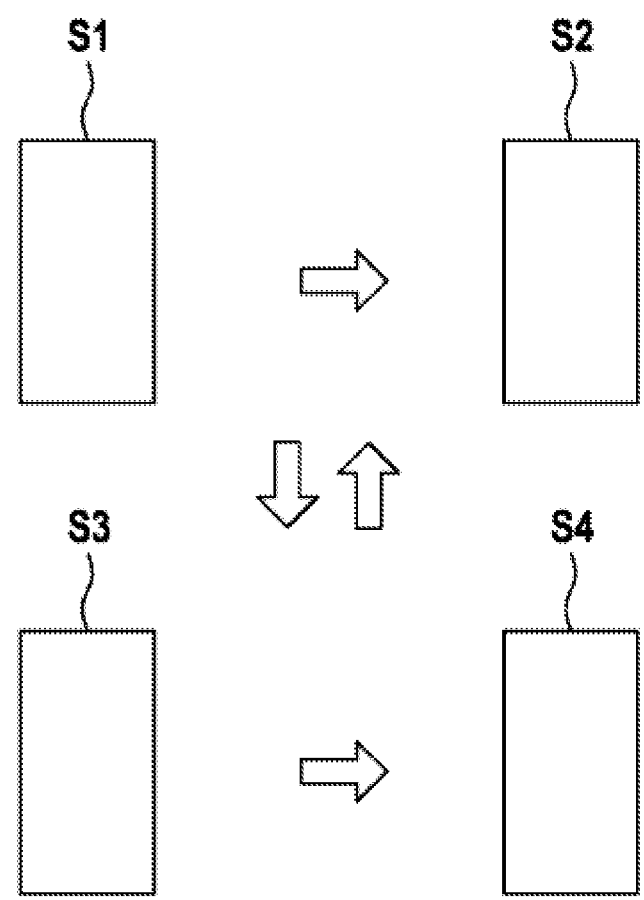

PRESSURE STORAGE DEVICE FOR STORING A MEDIUM, AND METHOD FOR OPERATING A PRESSURE STORAGE DEVICE

BACKGROUND

The present invention relates to a pressure storage device for storing a medium and to a method for operating a pressure storage device.

Mobile compressed hydrogen storage systems may usually comprise several steel cylinders, similar to a cylinder bundle. In this case, the individual cylinders can be filled such that a central connection can be produced during filling up to the system pressure of about 700 bar. A further central line can empty the cylinder bundle toward a fuel cell system and generate a system-related minimum pressure in the cylinders. Each individual cylinder may be provided with a controllable valve.

Hydrogen diffuses in steel at sufficient speed at room temperature. If the pressure in the system increases, e.g., by filling the cylinders, hydrogen diffuses into the steel and can lead to an impairment of the mechanical properties. If the pressure drops, hydrogen can diffuse out of the steel again and thus reduce the risk of impairment of the mechanical properties.

DE 11 2006 003 013 B4 describes a tank having a fitting and a valve, wherein the valve is fixed in the fitting.

SUMMARY

The present invention creates a pressure storage device for storing a medium and a method for operating a pressure storage device.

Preferred further developments are the subject matter of the dependent claims.

The idea underlying the present invention is to specify a pressure storage device for storing a medium under pressure and a method for operating a pressure storage device that is characterized by an advantageous filling and emptying option in which penetration of the stored medium into the material of the pressure vessels can be reduced or even avoided. Even during storage of the medium, an internal pressure of the pressure vessels can be kept at as low a pressure level as possible for as long as possible.

According to the invention, the pressure storage device for storing a medium under pressure comprises at least a first pressure vessel having a first valve device, and a second pressure vessel having a second valve device; at least one feed line and/or one discharge line, which is connected to the first valve device and to the second valve device, and wherein the medium can be filled via the feed line into the first pressure vessel and into the second pressure vessel, and/or the first pressure vessel and the second pressure vessel can be emptied via the discharge line; a control device, which is connected to the first valve device and to the second valve device to open and/or close the same and is configured to control filling and/or emptying of the first pressure vessel and of the second pressure vessel with and/or of the medium such that the pressure in the first pressure vessel and in the second pressure vessel is at or below a predefined pressure level.

With the manner of emptying, the present invention can reduce a risk of impairment of the mechanical properties of the pressure vessels, which may, for example, be formed as steel cylinders, by means of an intelligent filling and emptying strategy of the individual pressure vessels.

The pressure storage device may itself comprise or be (externally) connected to a pump for generating the necessary pressure. Alternatively, a filling tank itself may be under sufficient pressure and, during filling, this pressure can then build up, at least partially, in the pressure vessels.

The predefined pressure level may be a maximum filling pressure or a minimum residual pressure, which may serve as a reference for emptying and to which the internal pressure of the pressure vessel is at least lowered.

According to a preferred embodiment of the pressure storage device, the first pressure vessel and the second pressure vessel comprise a metal and into which hydrogen can be received as a medium.

The metal may be steel, for example.

According to a preferred embodiment of the pressure storage device, it is formed as a mobile system and is configured to be installed in a vehicle or with a mobile structure.

According to a preferred embodiment of the pressure storage device, the first pressure vessel and the second pressure vessel each comprise a pressure sensor.

Via the pressure sensor, which may be connected to the control device and depending on which the valve device can then be controlled, it is possible to determine whether the predefined pressure level has been reached in the pressure vessel(s) or how high the pressure in the pressure vessel(s) is.

According to a preferred embodiment of the pressure storage device, the control device is configured to fill and/or empty the first pressure vessel and the second pressure vessel serially in a predefined order.

Filling may take place up to a predefined filling pressure, and emptying may take place up to a predefined emptying pressure, which specifies the respective predefined pressure level.

According to a preferred embodiment of the pressure storage device, the first pressure vessel and the second pressure vessel are connected in parallel to one another via the feed line and/or the discharge line.

According to the invention, in the method for operating a pressure storage device according to the invention, the first pressure vessel and the second pressure vessel are filled with a medium through the feed line and, in the process, the first valve device and the second valve device are controlled and opened, wherein the control device controls filling with the medium such that the pressure in the first pressure vessel and in the second pressure vessel is at or below a predefined pressure level; and/or the first pressure vessel and the second pressure vessel are emptied through the discharge line and, in the process, the first valve device and the second valve device are controlled and opened, wherein the control device controls emptying such that the pressure level in the first pressure vessel and in the second pressure vessel is below a further predefined pressure level.

According to a preferred embodiment of the method, the first pressure vessel and the second pressure vessel are filled such that a pressure of the medium in the first pressure vessel and in the second pressure vessel is raised sequentially or simultaneously to or above a predefined filling pressure, or the first pressure vessel and the second pressure vessel are emptied such that a pressure in the first pressure vessel and in the second pressure vessel is lowered sequentially or simultaneously to or below a predefined emptying pressure.

According to a preferred embodiment of the method, an emptying and filling cycle takes place, wherein the first pressure vessel is emptied and, in the process, a pressure of the medium in the first pressure vessel is lowered to or below a predefined emptying pressure and a pressure of the medium in the second pressure vessel is only partially lowered, at least the first pressure vessel is refilled thereafter, and, during re-emptying, a pressure of the medium in the second pressure vessel is first lowered to or below the predefined emptying pressure.

Instead of the first pressure vessel, several pressure vessels may also be emptied and filled like the first pressure vessel and then filled and emptied from a particular pressure vessel as described according to the second pressure vessel.

According to a preferred embodiment of the method, the first pressure vessel and the second pressure vessel are emptied sequentially or simultaneously up to a predefined emptying pressure and only thereafter, the first pressure vessel and the second pressure vessel are emptied sequentially or simultaneously to below the predefined emptying pressure.

Instead of the first pressure vessel, several pressure vessels may also be emptied and filled like the first pressure vessel and then filled and emptied from a particular pressure vessel as described according to the second pressure vessel.

The method can also advantageously be characterized by the already mentioned features of the pressure storage device, and vice versa.

Further features and advantages of embodiments of the invention arise from the following description with reference to the accompanying drawings.

BRIEF DESCRIPTION OF THE DRAWINGS

The present invention is explained in more detail below with reference to the exemplary embodiments indicated in the schematic figures of the drawing.
Shown are:

FIG. 1 a schematic illustration of a pressure storage device for storing a medium under pressure according to an exemplary embodiment of the present invention; and FIG. 2 a block diagram of method steps of a method for operating a pressure storage device according to the invention according to an exemplary embodiment of the present invention.

In the figures, identical reference signs denote identical or functionally identical elements.

DETAILED DESCRIPTION

FIG. 1 shows a schematic illustration of a pressure storage device for storing a medium under pressure according to an exemplary embodiment of the present invention.

The pressure storage device 10 for storing a medium M under pressure comprises: at least a first pressure vessel B1 having a first valve device V1, and a second pressure vessel B2 having a second valve device V2, wherein FIG. 1 shows still further pressure vessels B3 to Bn having corresponding valve devices V3 to Vn. The pressure storage device 10 can comprise at least one feed line Z and/or one discharge line A, e.g., as a tube, which is connected to the first valve device V1 and to the second valve device V2, and also to the other valve devices V3 to Vn, and wherein the medium can be filled via the feed line Z into the pressure vessels B1 to Bn and/or the pressure vessels B1 to Bn can be emptied via the discharge line A. The feed line Z and the discharge line A are shown as the same tube in FIG. 1, but they may each comprise their own tube of the same or different dimension or type. The pressure storage device 10 furthermore comprises a control device SE, which is connected to the first valve device V1 and to the second valve device V2, and the further valve devices, to open and/or close the same and is configured to control filling and/or emptying of the first pressure vessel B1 and of the second pressure vessel B2, and also of the further pressure vessels B3 to Bn, with and/or of the medium such that the pressure in the first pressure vessel B1 and in the second pressure vessel B2, and in the further pressure vessels B3 to Bn, is at or below a predefined pressure level. Thus, the predefined pressure level may comprise a minimum pressure for storing the medium that is reached during emptying and may be maintained for as long a time as possible in order to reduce the penetration of the medium into the material of the respective pressure vessel.

The pressure vessels B1 to Bn may comprise a metal, and the medium may comprise hydrogen. At low pressure, entry of hydrogen into the metal can then be reduced.

By means of the control device and the feed line and/or the discharge line, a particular operating strategy can advantageously be carried out, wherein a filling and/or emptying cycle can take place, in which each or as many pressure vessels as possible are filled with only the minimum pressure over a maximum period of time so that hydrogen entry (entry of the medium into the wall material of the pressure vessel) can be minimized. This may, for example, take place sequentially by serially and thereby non-simultaneously filling or emptying the individual pressure vessels, wherein the first pressure vessel B1 can be emptied to a predefined minimum pressure (predefined emptying pressure) before the second pressure vessel B2 is emptied, likewise for the further pressure vessels B3 to Bn. If a pressure vessel is then not completely emptied during an emptying cycle, it can then be emptied with priority during the next emptying cycle.

Thus, impairment of the mechanical properties of the pressure vessel, which may be formed as a steel vessel, can be reduced by each pressure vessel being loaded at least temporarily with the minimum pressure over a particular period of time at the latest within two emptying cycles. This increases the possibility of hydrogen diffusing out of the material. In the cycles, starting from a filled system, the pressure vessels can be emptied, in particular in a manner already mentioned. Then, the at least one of the pressure vessels may be emptied to the predefined emptying pressure, which may constitute a minimum residual pressure. The pressure vessels may be emptied sequentially in this manner. Thereafter, refilling may take place. In case of re-emptying, the pressure vessel that was not emptied to the predefined emptying pressure in the previous emptying cycle may then be emptied first, likewise all further vessels that were not previously emptied, advantageously serially relative to one another.

Alternatively, the overall system, i.e., all pressure vessels, may first be emptied to a particular pressure (transition pressure) before all or some pressure vessels are emptied serially.

During filling, the pressure vessels may, for example, be filled (predefined filling pressure) of about 700 bar. The discharge line A may empty the pressure vessels toward a fuel cell system and generate a system-related minimum pressure (predefined emptying pressure) in the pressure vessels.

FIG. 2 shows a block diagram of method steps of a method for operating a pressure storage device according to the invention according to an exemplary embodiment of the present invention.

According to the invention, in the method for operating a pressure storage device according to the invention, the first pressure vessel and the second pressure vessel are filled S1 with a medium through the feed line and, in the process, the first valve device and the second valve device are controlled S2 and opened, wherein the control device controls filling with the medium such that the pressure in the first pressure vessel and in the second pressure vessel is at or below a predefined pressure level; and/or the first pressure vessel and the second pressure vessel are emptied S3 through the discharge line and, in the process, the first valve device and the second valve device are controlled S4 and opened, wherein the control device controls emptying such that the pressure level in the first pressure vessel and in the second pressure vessel is below a predefined pressure level.

Although the present invention has been completely described above with reference to the preferred exemplary embodiment, it is not limited thereto but can be modified in many ways.

The invention claimed is:

1. A pressure storage device (10) for storing a medium (M) under pressure, comprising:
    at least a first pressure vessel (B1) having a first valve device (V1), and a second pressure vessel (B2) having a second valve device (V2);
    at least one feed line (Z) and/or one discharge line (A), which is connected to the first valve device (V1) and to the second valve device (V2), and wherein the medium can be filled into the first pressure vessel (B1) and into the second pressure vessel (B2) via the feed line (Z) and/or the first pressure vessel (B1) and the second pressure vessel (B2) can be emptied via the discharge line (A);
    a control device (SE), which is connected to the first valve device (V1) and to the second valve device (V2) to open and/or close the same and is configured to control filling and/or emptying of the first pressure vessel (B1) and of the second pressure vessel (B2) with and/or of the medium such that the pressure in the first pressure vessel (B1) and in the second pressure vessel (B2) is at or below a predefined pressure level,
    wherein the predefined pressure level is chosen to reduce or avoid a penetration of the medium into a first material of the first pressure vessel or a second material of the second pressure vessel.

2. The pressure storage device (10) according to claim 1, in which the first pressure vessel (B1) and the second pressure vessel (B2) comprise a metal and in which hydrogen can be received as a medium.

3. The pressure storage device (10) according to claim 1, which is formed as a mobile system and is configured to be installed in a vehicle or with a mobile structure.

4. The pressure storage device (10) according to claim 1, in which the first pressure vessel (B1) and the second pressure vessel (B2) each comprise a pressure sensor.

5. The pressure storage device (10) according to claim 1, in which the control device (SE) is configured to serially fill and/or empty the first pressure vessel (B1) and the second pressure vessel (B2) in a predefined order.

6. The pressure storage device (10) according to claim 1, in which the first pressure vessel (B1) and the second pressure vessel (B2) are connected in parallel to one another via the feed line (Z) and/or the discharge line (A).

7. A method for operating a pressure storage device (10) according to claim 1, comprising the steps of:
    filling (S1) the first pressure vessel (B1) and the second pressure vessel (B2) with a medium through the feed line (Z) and, in the process, controlling (S2) and opening the first valve device (V1) and the second valve device (V2), wherein the control device (SE) controls filling with the medium such that the pressure level in the first pressure vessel (B1) and in the second pressure vessel (B2) is at or below a predefined pressure level; and/or
    emptying (S3) the first pressure vessel (B1) and the second pressure vessel (B2) through the discharge line (A) and, in the process, controlling (S4) and opening the first valve device (V1) and the second valve device (V2), wherein the control device (SE) controls emptying such that the pressure in the first pressure vessel (B1) and in the second pressure vessel (B2) is below a further predefined pressure level,
    wherein the predefined pressure level and the further predefined pressure level are chosen to reduce or avoid a penetration of the medium into a first material of the first pressure vessel or a second material of the second pressure vessel.

8. The method according to claim 7, in which the first pressure vessel (B1) and the second pressure vessel (B2) are filled such that a pressure of the medium in the first pressure vessel (B1) and in the second pressure vessel (B2) is raised sequentially or simultaneously to or above a predefined filling pressure, or the first pressure vessel (B1) and the second pressure vessel (B2) are emptied such that a pressure in the first pressure vessel (B1) and in the second pressure vessel (B2) is lowered sequentially or simultaneously to or below a predefined emptying pressure.

9. The method according to claim 7, in which an emptying and filling cycle takes place, wherein the first pressure vessel (B1) is emptied and, in the process, a pressure of the medium in the first pressure vessel (B1) is lowered to or below a predefined emptying pressure and a pressure of the medium in the second pressure vessel (B2) is only partially lowered, at least the first pressure vessel (B1) is refilled thereafter, and, during re-emptying, a pressure of the medium in the second pressure vessel (B2) is first lowered to or below the predefined emptying pressure.

10. The method according to claim 7, in which the first pressure vessel (B1) and the second pressure vessel (B2) are emptied sequentially or simultaneously up to a predefined emptying pressure and only thereafter, the first pressure vessel (B1) and the second pressure vessel (B2) are emptied sequentially or simultaneously to below the predefined emptying pressure.

* * * * *